(12) United States Patent
Saleh-Esa (10) Patent No.: US 10,838,846 B1
(45) Date of Patent: Nov. 17, 2020

(54) METHOD AND SYSTEM FOR IMPLEMENTING AN AUTOMATION SOFTWARE TESTING AND PACKAGING FRAMEWORK

(71) Applicant: JPMorgan Chase Bank, N.A., New York, NY (US)

(72) Inventor: Chagla M. Saleh-Esa, Rego Park, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 42 days.

(21) Appl. No.: 15/596,068

(22) Filed: May 16, 2017

Related U.S. Application Data (60) Provisional application No. 62/336,878, filed on May 16, 2016.

(51) Int. Cl.
*G06F 9/44* (2018.01)
*G06F 11/36* (2006.01)

(52) U.S. Cl.
CPC ...... *G06F 11/3664* (2013.01); *G06F 11/3604* (2013.01)

(58) Field of Classification Search
None
See application file for complete search history.

(56) References Cited

U.S. PATENT DOCUMENTS

| | | | | |
|---|---|---|---|---|
| 9,032,373 | B1* | 5/2015 | Gupta | G06F 11/3688 717/127 |
| 9,507,700 | B1* | 11/2016 | Vignet | G06F 11/3688 |
| 9,563,544 | B2* | 2/2017 | Mecke | G06F 11/3688 |
| 9,569,204 | B2* | 2/2017 | Mansour | G06F 8/447 |
| 9,600,401 | B1* | 3/2017 | Haischt | G06F 11/3664 |
| 9,606,900 | B1* | 3/2017 | Pradhan | G06F 11/368 |
| 9,710,367 | B1* | 7/2017 | Nagineni | G06F 11/3684 |
| 9,798,763 | B2 | 10/2017 | Wright, Sr. | |
| 9,983,860 | B1* | 5/2018 | Koty | G06F 8/60 |
| 9,992,022 | B1 | 6/2018 | Chapman | |
| 2007/0234293 | A1* | 10/2007 | Noller | G06F 11/3688 717/124 |

(Continued)

OTHER PUBLICATIONS

International Searching Authority, PCT International Search Report and Written Opinion, International Application No. PCT/US2019/025273, dated May 3, 2019, pp. 1-12.

*Primary Examiner* — Insun Kang
(74) *Attorney, Agent, or Firm* — Hunton Andrews Kurth LLP (57) ABSTRACT

The invention relates to a corporate technologies and risk (CTR) automation framework. The innovative framework comprises: a self-service portal that receives an input relating to a software application from an application developer; a build framework comprising a standards framework that implements a set of rules; a Quality Assurance (QA) processor that automatically generates test scripts for the software application; a performance processor, comprising a parser, a designer processor, analyzer processor and a validator processor, that automatically generates and executes performance test scripts; and a CTR communication network, coupled to the build framework, QA processor and the performance processor, that communicates with one or more targets via a distributed ledger functionality for entitlements and events.

14 Claims, 9 Drawing Sheets

(56) References Cited

U.S. PATENT DOCUMENTS

| | | | |
|---|---|---|---|
| 2008/0052314 A1* | 2/2008 | Batabyal | G06F 8/36 |
| 2008/0082968 A1* | 4/2008 | Chang | G06F 11/3688 717/128 |
| 2008/0127101 A1* | 5/2008 | Anafi | G06F 11/3664 717/125 |
| 2009/0070742 A1* | 3/2009 | Voruganti | G06F 11/3688 717/124 |
| 2010/0235807 A1* | 9/2010 | Doddappa | G06F 8/10 717/101 |
| 2011/0246992 A1* | 10/2011 | Kern | G06F 9/5072 718/100 |
| 2013/0104106 A1* | 4/2013 | Brown | G06F 11/3696 717/124 |
| 2013/0152047 A1* | 6/2013 | Moorthi | G06F 11/368 717/124 |
| 2013/0179858 A1* | 7/2013 | Mecke | G06F 11/3688 717/106 |
| 2013/0275946 A1* | 10/2013 | Pustovit | G06F 11/3684 717/124 |
| 2014/0075415 A1* | 3/2014 | Goldish | G06F 11/3684 717/124 |
| 2014/0089900 A1* | 3/2014 | Shrivastava | G06F 9/44589 717/126 |
| 2014/0380281 A1* | 12/2014 | McLaughlin | G06F 11/3688 717/127 |
| 2015/0100684 A1* | 4/2015 | Maes | G06F 11/3672 709/224 |
| 2015/0106791 A1* | 4/2015 | Karuppiah | G06F 11/3688 717/127 |
| 2015/0199197 A1* | 7/2015 | Maes | G06F 8/71 717/122 |
| 2015/0220426 A1* | 8/2015 | Spektor | G06F 11/36 717/131 |
| 2015/0234732 A1* | 8/2015 | Levi | G06F 11/3684 717/125 |
| 2015/0278075 A1* | 10/2015 | Loganathan | G06F 11/3684 714/38.1 |
| 2015/0286556 A1* | 10/2015 | Ellis | G06F 11/3684 717/125 |
| 2015/0355896 A1* | 12/2015 | Benge | H04L 67/34 717/171 |
| 2015/0370690 A1* | 12/2015 | Rodmell | G06F 11/008 717/124 |
| 2016/0062876 A1* | 3/2016 | Narayanan | G06F 11/3684 717/130 |
| 2016/0117235 A1* | 4/2016 | Mishra | G06F 11/368 714/38.1 |
| 2016/0132421 A1* | 5/2016 | Cobb, Jr. | G06F 11/3688 717/131 |
| 2016/0147642 A1* | 5/2016 | Haeuptle | G06F 11/3664 717/124 |
| 2016/0179659 A1* | 6/2016 | Champlin-Scharff | G06F 17/271 717/126 |
| 2016/0191534 A1 | 6/2016 | Mallozzi | |
| 2016/0246838 A1* | 8/2016 | Li | G06F 11/3672 |
| 2016/0253172 A1* | 9/2016 | Shani | G06F 8/30 717/101 |
| 2016/0275003 A1* | 9/2016 | Balakrishnan | G06F 11/3672 |
| 2016/0285694 A1* | 9/2016 | Maes | G06F 9/5072 |
| 2016/0328713 A1 | 11/2016 | Ebrahimi | |
| 2016/0378649 A1* | 12/2016 | Eilam | G06F 11/3688 717/131 |
| 2017/0031676 A1* | 2/2017 | Cecchetti | H04L 9/0891 |
| 2017/0053131 A1* | 2/2017 | Modi | G06F 17/30598 |
| 2017/0083423 A1* | 3/2017 | Freed | G06F 11/263 |
| 2017/0115976 A1* | 4/2017 | Mills | G06F 8/71 |
| 2017/0123777 A1* | 5/2017 | Mittal | G06F 8/20 |
| 2017/0147480 A1* | 5/2017 | Lachwani | G06F 11/3684 |
| 2017/0168866 A1* | 6/2017 | Kono | G06F 9/45533 |
| 2017/0177765 A1* | 6/2017 | Dusanapudi | G06F 16/23 |
| 2017/0185913 A1* | 6/2017 | Codella | G06N 20/00 |
| 2017/0235713 A1* | 8/2017 | Martensson | G06F 17/243 715/221 |
| 2017/0262359 A1* | 9/2017 | Agrawal | G06F 11/3684 |
| 2017/0293550 A1* | 10/2017 | Song | G06F 11/3608 |
| 2018/0025166 A1* | 1/2018 | Daniel | G06Q 10/06 713/189 |
| 2018/0089256 A1 | 3/2018 | Wright, Sr. | |
| 2018/0113752 A1 | 4/2018 | Derbakova | |
| 2018/0248880 A1 | 8/2018 | Sardesai | |
| 2018/0300225 A1* | 10/2018 | Topholt | G06F 11/3664 |
| 2019/0052551 A1* | 2/2019 | Barczynski | H04L 41/12 |
| 2019/0311285 A1* | 10/2019 | Miserendino | G06N 5/04 |

\* cited by examiner

METHOD AND SYSTEM FOR IMPLEMENTING AN AUTOMATION SOFTWARE TESTING AND PACKAGING FRAMEWORK

CROSS REFERENCE TO RELATED APPLICATIONS

The application claims priority to U.S. Provisional Application 62/336,878, filed May 16, 2016, the contents of which are incorporated herein in its entirety.

FIELD OF THE INVENTION

The present invention generally relates to automated software testing and packaging and more specifically to implementing corporate technologies and risk (CTR) performance testing and packaging framework.

BACKGROUND OF THE INVENTION

Application development service may take into account the entire lifecycle of an application design or build, testing, release or deploy and operational support. The current state involves a down-the-line approach where an application developer passes support production deployment to testing teams. The current state starts at a build phase, then moves to a test phase, then deploy phase and finally to an operate phase in a linear manner. The current process leads to gaps, such as capital gap, innovation gap and time gap. Application Development Services is a labor intensive siloed organization with layers of overheard and redundancy. Automation is limited to pockets of excellence within each siloed tower. Current processes can take months when the need is for daily responses to business needs.

Traditional performance testing takes a significant amount of time, effort and dedicated resources. Current technologies have delays in on-boarding, lack continuous packaging delivery, utilize semi-automated functions and suffer from coordination delays.

These and other drawbacks exist.

SUMMARY OF THE INVENTION

Accordingly, one aspect of the invention is to address one or more of the drawbacks set forth above. According to an embodiment of the present invention, an automated computer implemented system implements a corporate technologies and risk (CTR) automation framework. The system comprises: a self-service portal that receives an input relating to a software application from an application developer; a build framework comprising a standards framework that implements a set of rules; a Quality Assurance (QA) processor that automatically generates test scripts for the software application; a performance processor, comprising a parser, a designer processor, analyzer processor and a validator processor, that automatically generates and executes performance test scripts; and a CTR communication network, coupled to the build framework, the QA processor and the performance processor, that communicates with one or more targets via a distributed ledger functionality for entitlements and events.

According to another embodiment of the present invention, a computer readable medium contains program instructions for implementing a corporate technologies and risk (CTR) automation framework, wherein execution of the program instructions by one or more processors of a computer system causes the one or more processors to carry out the steps of: receiving, via a self-service portal, an input relating to a software application from an application developer; automatically generating and executing, via a Quality Assurance (QA) processor, test scripts for the software application; the build framework comprises a standards framework that implements a set of rules; automatically generating and executing, via a performance processor, performance test scripts, wherein the performance processor comprises a parser, a designer processor, analyzer processor and a validator processor; and communicating, via a CTR communication network, with one or more targets, the CTR communication network coupled to the build framework, QA processor and the performance processor, where the CTR communication network communicates via a distributed ledger functionality for entitlements and events.

The computer implemented system, method and medium described herein provide unique advantages to application developers and various entities including financial institutions, according to various embodiments of the invention. The innovative system and method facilitates automated build by leveraging firmwide code repositories and development tools in support of standardization. The system further provides continuous testing where end-to-end (E2E) automation allows application development teams to complete on demand testing activities for quality assurance, performance and security. In addition, the system supports always-production-ready code through continuous integration into automated platform and infrastructure (e.g., PaaS, IaaS, etc.) and operates feedback loops where teams are integrated early and often in the lifecycle. The innovative system and method further reduces labor and increases velocity by creating opportunity for multiple daily releases in support of changing business needs. The system provides integration of emerging technology where automation creates a beachhead for machine learning, Blockchain and DevOps organizational structures. Also, by removing overhead, product owners can reallocate time to clients. These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to creating a self-service portal for software developers in packaging, quality assurance and performance testing which utilizes distributed ledger functionality, such as Blockchain/Openchain for entitlements and events. For example, Blockchain may represent a distributed database structure that maintains a continuously growing list of data records that each refer to previous items on the list and is thus hardened against tampering and revision. Openchain may represent an open source distributed ledger technology.

According to an embodiment of the present invention, end-to-end (E2E) automation of packaging services aims to provide self-service onboarding, self-service packaging, self-service deployments, set standards to build environment, stable and resilient build environments, integrated quality assurance and performance testing tollgate, authorized roles and responsibilities, up-to-date asset information, and transparency of controls and audit.

The various embodiments of the present invention provide multiple benefits and advantages. For example, the system and method of the present invention provides continuous application delivery without delays, Dev-Ops model, resource optimization, higher return on investment due to extreme automation, stable environment due to reduction of incidents, secure environment due to decentralized entitlements, and highly standard application environments enabling ease of operate.

The various embodiments of the present invention may be implemented in any software development lifecycle application. An embodiment of the present invention enables software developers to be more agile and further ensures that the software code ends up in production in an efficient manner.

An embodiment of the present invention is directed to the development of a CTR highway that connects various components in a decentralized environment. The software packaging solution of the present invention deploys software to various targets in a safe and consistent manner through a CTR highway that facilitates software packaging, quality assurance and performance testing.

An embodiment of the present invention is directed to creating automated test scripts and employing a Blockchain technology to entitlements as well as keeping track of events that are happening on the system. This further includes node agents that provide micro services for entitlements, change and release.

Figure 1:
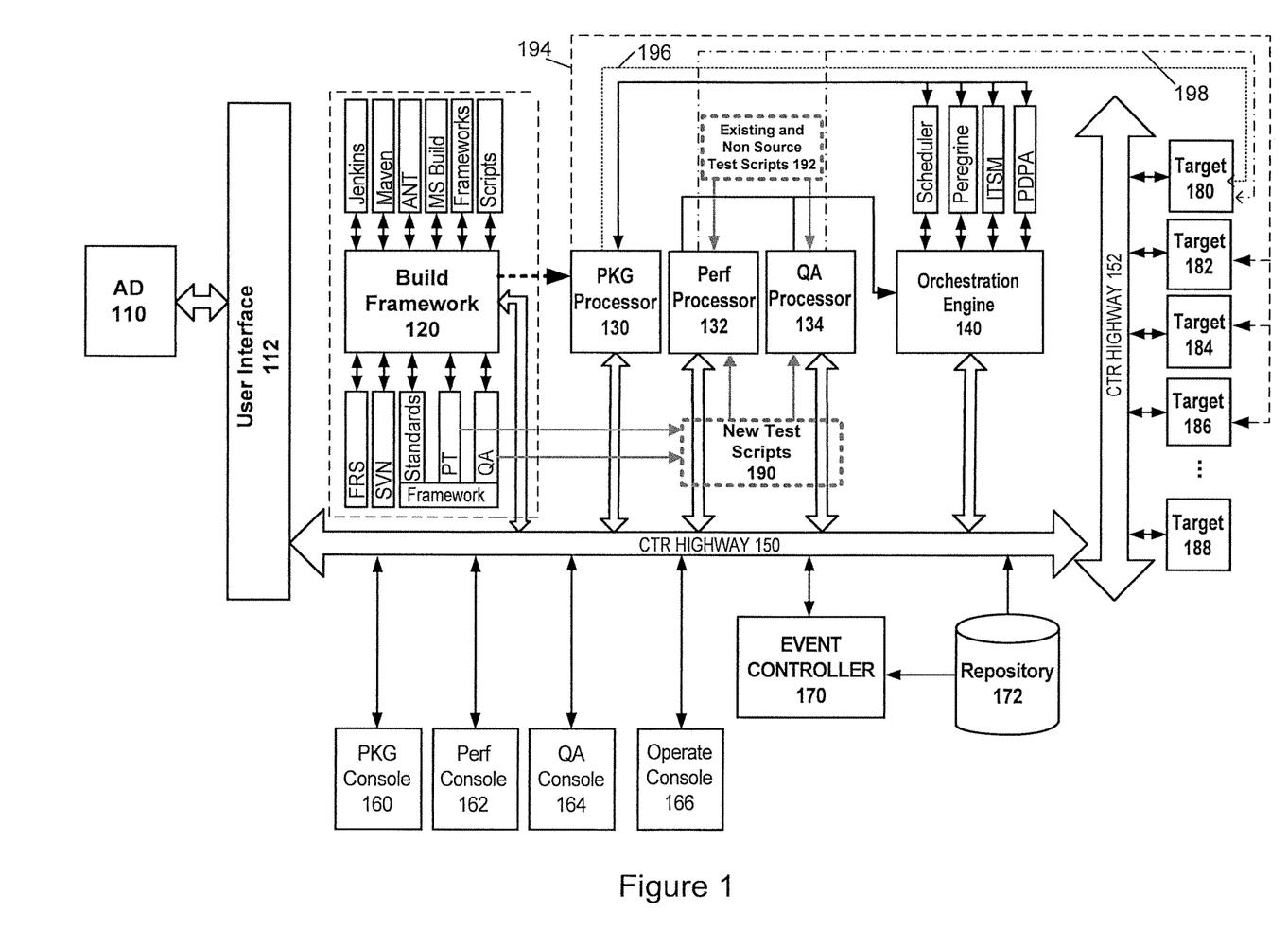
FIG. 1 is an exemplary system diagram of an Automation Framework, according to an embodiment of the present invention.

FIG. 1 is an exemplary system diagram of an Automation Framework, according to an embodiment of the present invention. Application Development Services may take into account the entire lifecycle of an application design or build, testing, release or deploy and operational support. FIG. 1 illustrates an Application Development (AD) 110, User Interface 112, CTR Highway 150, 152 in communication with a plurality of Targets, represented by 180, 182, 184, 186 and 188. CTR Highway 150 interfaces with a Build Framework 120. CTR Highway 150 further communicates with a plurality of Processors 130, 132 and 134, an Orchestration Engine 150, a plurality of Consoles 160, 162, 164, 168, an Event Controller 170 and one or more repositories, represented by Repository 172. The processors may include Packaging (PKG) Processor 130, Performance (Perf) Processor 132 and Quality Assurance (QA) Processor 134. And, the consoles may include Packaging (PKG) Console 160, Performance (Perf) Console 162, Quality Assurance (QA) Console 164 and Operate Console 166. New Test Scripts 190 and Existing and Non Source Test Scripts 192 may be generated and provided to Performance Processor 132 and QA Processor 132. Production Environment is represented by 194 and Test Environment is represented by 196. These modules/components are exemplary and illustrative, the system may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention is directed to delivering tools, processes and standards to support automated build, continuous testing and always-production-ready code. For example, AD 110 may codify test and deploy requirements (e.g., volume, count, etc.) within code build tools and repositories. Build Framework 120 may include repositories and tools in support of efficient application development as well as a framework interface in support of codification of testing and deployment requirements. The system may engage a Packaging Processor 130 (e.g., ARM) to deliver code to a target environment with quality gate validation, via Orchestration Engine 140. A Deployment Framework may include approval and quality gate tools in support of valid deployment as well as tools and processes delivering deployment code to a target environment. Once deployment is complete, Performance Processor 132 and Quality Assurance (QA) Processor 134 may be engaged. A Test Framework may include testing based on system integration and application response (via Performance Processor 132) as well as testing based on completeness and expected results (via QA Processor 134). Standards may be defined and codified using build, deploy and test frameworks. A Standards Framework may include rules in support of codification of policies and requirements to support build, test and deployment. Rules may relate to environment, layout, entitlements, scans and policy, for example.

CTR Highway 150, 152 provides a mechanism to communicate between Targets 180, 182, 184, 186, 188 and the various components of the framework in a secure and stable manner. Using Blockchain/Openchain or other distributed architecture, the system supports entitlements linked to other entitlements. In addition, CTR Highway implements a general ledger/Blockchain functionality that provides guidance through the application process and ultimately functions as a self-service portal for developers.

Orchestration Engine 140 facilitates efficient workflows and orchestrates between and among different components of the framework.

An embodiment of the present invention is directed to integrating an innovative framework that integrates standards, performance testing (PT) and QA features, as shown in FIG. 1. The present invention is directed to automating software package delivery into production. The system of an embodiment of the present invention provides end-to-end continuous application delivery. Accordingly, software developers may write code that ends up in production in an automatic manner. For example, when code is developed, the system may auto-generate performance and QA test scripts and performance test scripts as well as standards and packaging wrappers required for an application to be delivered for production. If an error is detected, the entire process may be halted until the error is fixed or otherwise addressed. Once the build is completed and the package is ready, a sequence of processes may be performed. For example, a packaging processor may ensure that the package is created for the application. The processes may further interact with Orchestration Engine 140, which may determine specifics associated with the application deployment, e.g., where to be deployed, environment, post testing, QA testing, etc.

An embodiment of the present invention may be directed to an Automation Performance Testing (PT) Framework. PT Framework may assist developers to create a load. For example, the system may determine what application characteristics should look like to support 1-10 users and the additional testing, interfaces and other tools needed to support 5000 or more users. An AD may generate timing, values and iteration from a framework. In response, performance test scripts may be generated for performance testing.

Figure 2:
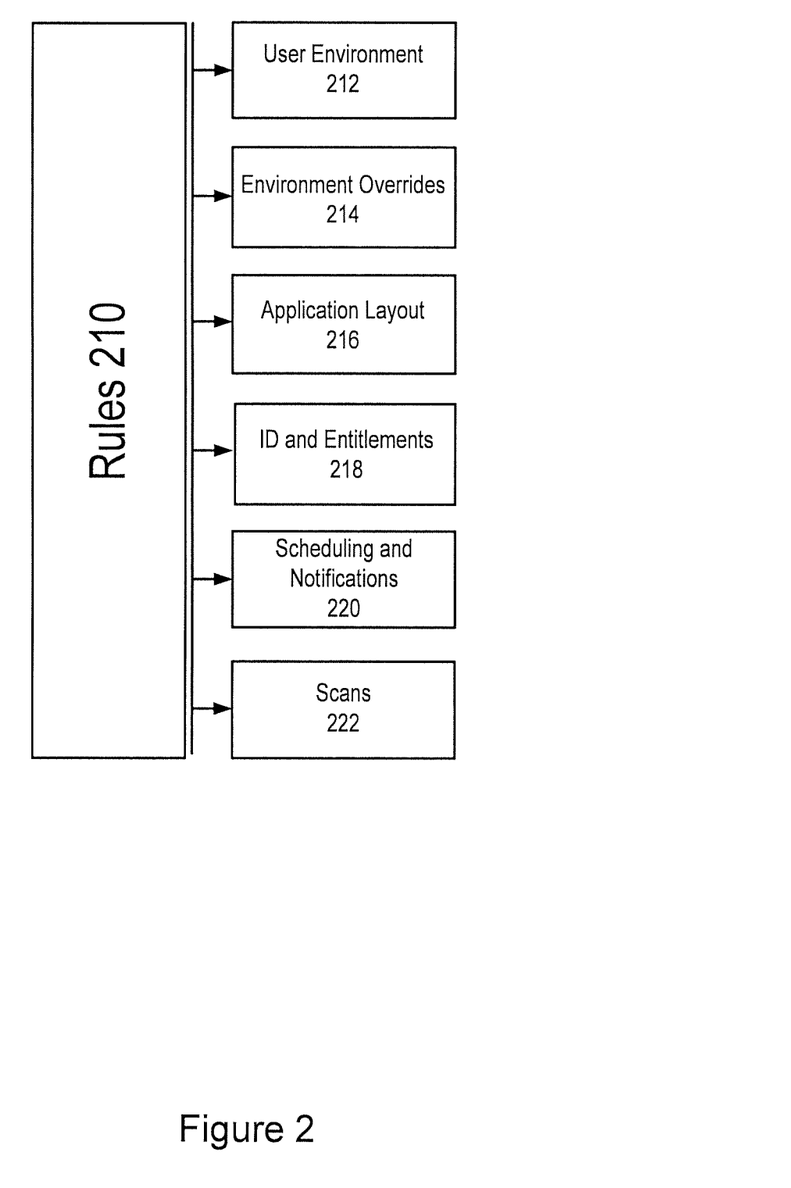
FIG. 2 is an exemplary illustration of an Automation Build Standards Framework, according to an embodiment of the present invention.

FIG. 2 is an exemplary illustration of an Automation Build Standards Framework, according to an embodiment of the present invention. Standards Framework represents a set of rules. For example, the rules may define certain characteristics of a software application. The set of rules may also include rules that affect the environment (e.g., this is how the environment should work), logs, property, versioning, etc.

As shown in FIG. 2, Rules 210 may be directed to User Environment 212; Environment Overrides 214, Application Layout 216, ID and Entitlements 218, Scheduling and Notifications 220, and Scans 222. For example, User Environment 212 may include JDK/JRE version, blessed framework and version, standard repository, and application versioning. Environment Overrides 214 may include up to N-2 JDK/JRE version, up to N-2 Framework versions and specific framework and repo. Application Layout 216 may include application logs and policy, configurations, and properties. ID and Entitlements 218 may include application ID, roles and repository credentials. Scheduling and Notifications 220 may include build schedule and triggers, and event notifications and distribution. Scans 222 may include threat and vulnerability, security, code efficiency and golden rule compliance.

Figure 3:
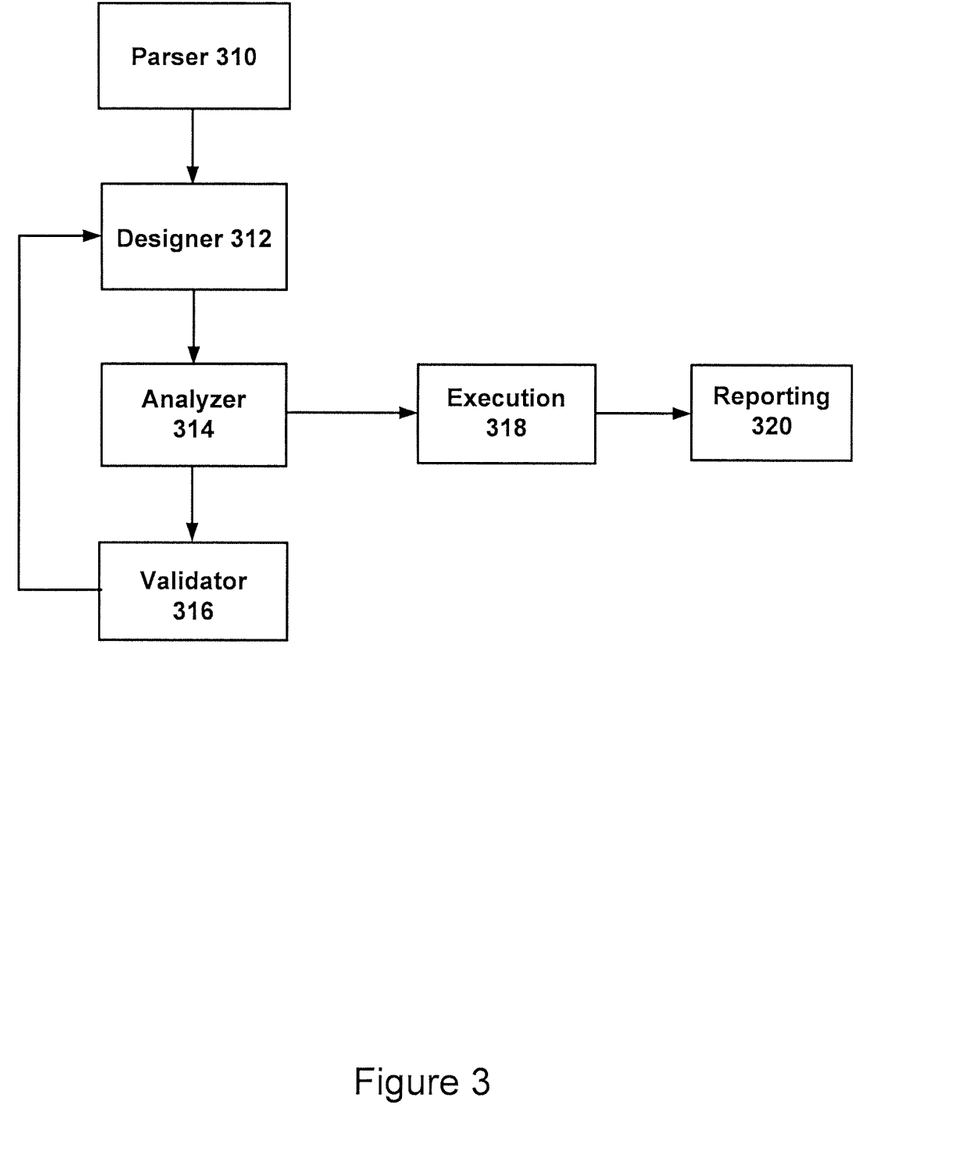
FIG. 3 is an exemplary illustration of an Automation Performance Processor, according to an embodiment of the present invention.

FIG. 3 is an exemplary illustration of an Automation Performance Processor, according to an embodiment of the present invention. An exemplary Performance Processor may include components, such as Parser 310, Designer 312, Analyzer 314, Validator 316, Execution 318 and Reporting 320. For example, Analyzer 314 may generate test scripts for execution and reporting.

According to an embodiment of the present invention, a Testing Framework may include a Performance Processor and a Quality Assurance Processor. In this exemplary application, Parser 310 may represent a collection of data and correlation of testable categories. Once code is deployed, Parser 310 may correlate data into testable categories (e.g., business, functional, etc.). Designer 312 may represent a test case generator and parameterization. Designer 312 may generate test scripts based on learned parameters and standards (e.g., performance—volume, iteration, count, etc.). Analyzer 314 may represent confirmation of testable data and test cases. Analyzer 314 may confirm if test cases are complete or if additional review is needed (e.g., not all data may be categorized). Validator 316 may perform a review of unstructured data and incomplete test scripts. Validator 316 may provide back to Designer 312 unstructured data and incomplete test scripts for additional review. Execution 318 may represent a test case builder/designer and parameterization. Execution 318 may execute and complete test scripts and then make them available to App Dev end users as well as other users. Reporting 320 may provide execution reporting and other supporting outputs.

An embodiment of the present invention may include a design capable of leveraging enhanced automation technology to support design and building of test cases and parameterization. For example, a Packaging Processor may represent tools and processes delivering development code to a target environment. In this example, Parser 310 may represent a collection of data and correlation to testable categories. Parser 310 may categorize and create correlation of data. For example, categories may include Business, Functional, Data and User Interface (UX) as well as Web Services. Other categories may be defined and implemented. Business may include data in support of products and services, e.g., stock price $5.70. Business may also include inputs relating to notifications, such as when a stock price goes to $5.70. Functional may include data in support of activity and process, e.g., last order execution. Functional may also include periodic stock price updates, running ticker of last order executed, up and down tick, etc. Data may include support scope of data, e.g., 6 months of stocks. Data may also include trends, such as price trends including 6 month stock price trend, for example. User Interface may include support to layout and user interface, e.g., drop down. For example, inputs to a test case may be parameterized and the respective floor and ceiling values (e.g., boundary) may be a process of machine learning. According to an exemplary illustration, it may be an iterative learning process where each of the inputs required are learned and parametrized along with the boundary values. Accordingly, learning improves over time and the iterations based on knowledge base.

Designer 312 may represent a test case generator and parameterization. Designer 312 may progressively build test cases in a stepped process based on learning from initial test case(s). For example, Designer 312 may create an initial test case as a start point for a build. Designer 312 may then learn from each build step to create parameters and boundaries, e.g., stock price will not be negative (boundary). The various features of the embodiments of the present invention realize benefits and advantages including a reduction in extraneous documentation, storage and auditability. Other benefits include consistency in quality by leveraging defined standards and parameterized frameworks to drive high value outputs. The system also leverages automated deployment and testing that allows for App Dev to continuously test and integrate code.

According to an embodiment of the present invention, Parser 310 may represent a XML and configuration parser as well as a correlator. For example, an audit process may involve parsing out data references, connection strings, ID passwords. This data may be used to generate test scripts and further validate the data. In this example, Parser 310 may receive inputs from configuration data (e.g., servlet mapping, service URL map, module configuration, service interface definition, etc.). Designer 312 may represent a test case builder, designer and parametrization. Designer 312 may receive an out of band user input test case. Analyzer 314 may generate known and structured test scripts that may be communicated to Execution 318 to run performance test scripts. Execution 318 may also receive SLAs and volumes. Using the execution output, reports may be generated at 320. Other outputs may be provided. Further, Analyzer 314 may communicate unknown and unstructured test scripts to Validator 316. Validator 316 may then provide test scripts and results to Designer 312.

Figure 4A:
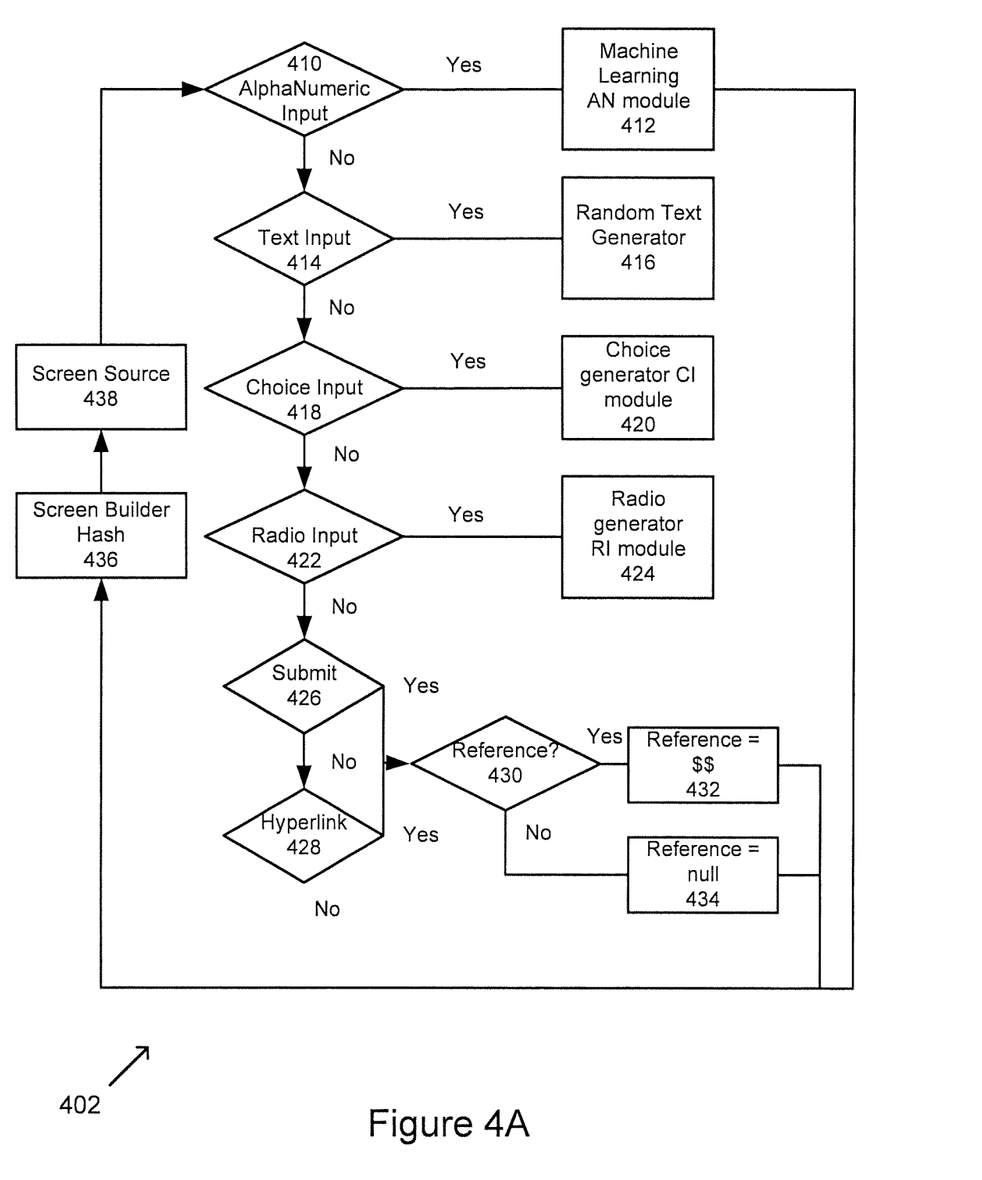
FIGS. 4A and 4B are an exemplary diagram of an automated test generator flow and automated test screen hash, according to an embodiment of the present invention.
Figure 4B:
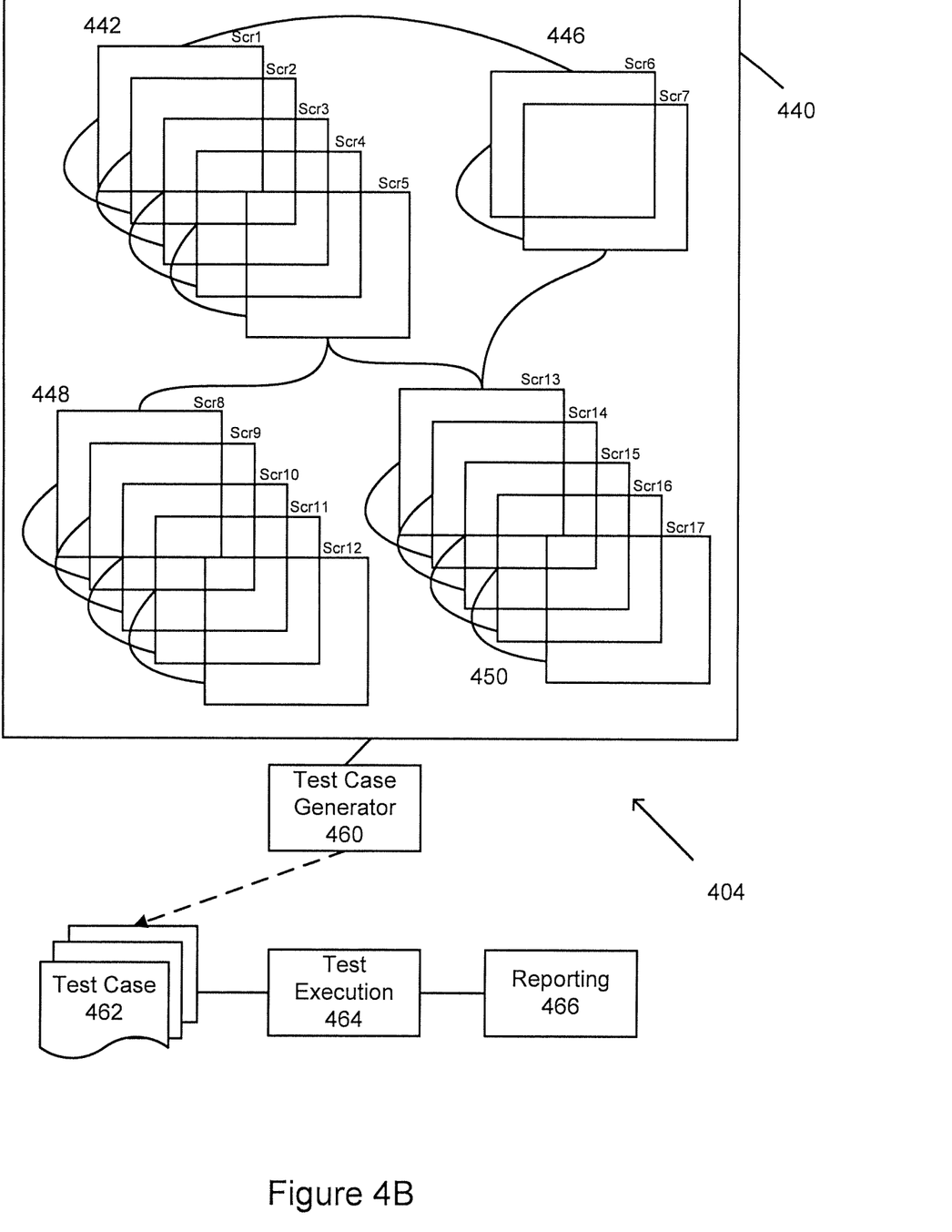

FIGS. 4A and 4B are an exemplary diagram of an automated test generator flow and automated test screen hash, according to an embodiment of the present invention. FIG. 4 illustrates an exemplary Automated Test Generator Flow 402 and FIG. 4B illustrates an Automated Test Screen Hash 404.

An embodiment of the present invention is directed applying machine learning to enable the system to learn an application. Once the application is built and deployed into a testing environment, the system may instantiate the application and learn the application. For example, a web application may include different types of inputs including alphanumeric inputs, text inputs, choice inputs, radio inputs, and other types of inputs. An embodiment of the present invention is directed to generating test cases for the various different types of inputs. An embodiment of the present invention applies machine learning to the alphanumeric input based on application use cases and other data. For example, the machine learning aspect may be implemented by one or more processors, such as the QA Processor or Perf Processor, where the test cases are generated and automatically executed.

At step 410, the system may determine whether an alphanumeric (AN) input is available. If yes, Machine Learning AN module may be initiated, at step 412. For an alphanumeric input, machine learning may depend on whether the user is inputting an SID, password, specific symbol for a trade, address, etc. Because the input is specific to the application, an embodiment of the present invention may apply machine learning to generate test flows for possible scenarios. At step 414, the system may determine whether a text input is available. If yes, Random Test Generator may be initiated, at step 416. At step 418, the system may determine whether a choice input (CI) is available. If yes, Choice Generator CI module may be initiated, at step 420. At step 422, the system may determine whether a radio input (RI) is available. A radio input may involve two or more predetermined choices. In this example, the system may generate a test case for each available choice. If yes, Radio Generator RI module may be initiated, at step 424. At step 426, the system may determine whether a submit input is available. At step 428, the system may determine whether a hyperlink input is available. For example, an input may involve submitting a hyperlink to another reference. If a submission or a hyperlink input are available, the system may determine a reference input is available, at step 430. If yes, then a reference field may be set to $$ at step 432. If not, then a reference field is set to null at step 434. A screen builder hash may be generated at step 436, which then feeds into a Screen Source at step 438. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

FIG. 4B is an exemplary diagram of an automated test screen hash, according to an embodiment of the present invention. The various input scenarios identified in the flow diagram of FIG. 4A may be used to generate an Automated Test Screen Hash. In this example, Screen 440 may include various inputs, represented by 442, 446, 448 and 450. Each input may include a series of options or screens, represented by Scr 1 to Scr 5 for input 442; Scr 6 to Scr 7 for input 446, Scr 8 to Scr 12 for input 448 and Scr 13 to Scr 17 for input 450. Accordingly, Screen Hash represents the various possible inputs available on a representative screen.

Screen 440 may serve as an input to Test Case Generator 460, which then generates test cases represented by 462. Based on the type of inputs and available responses, the system may generate a test case for each available choice. As discussed above, machine learning may be applied to certain inputs, such as an alphanumeric input. The test cases may then be executed via Test Execution 464 and further reported via Reporting 466.

Figure 5:
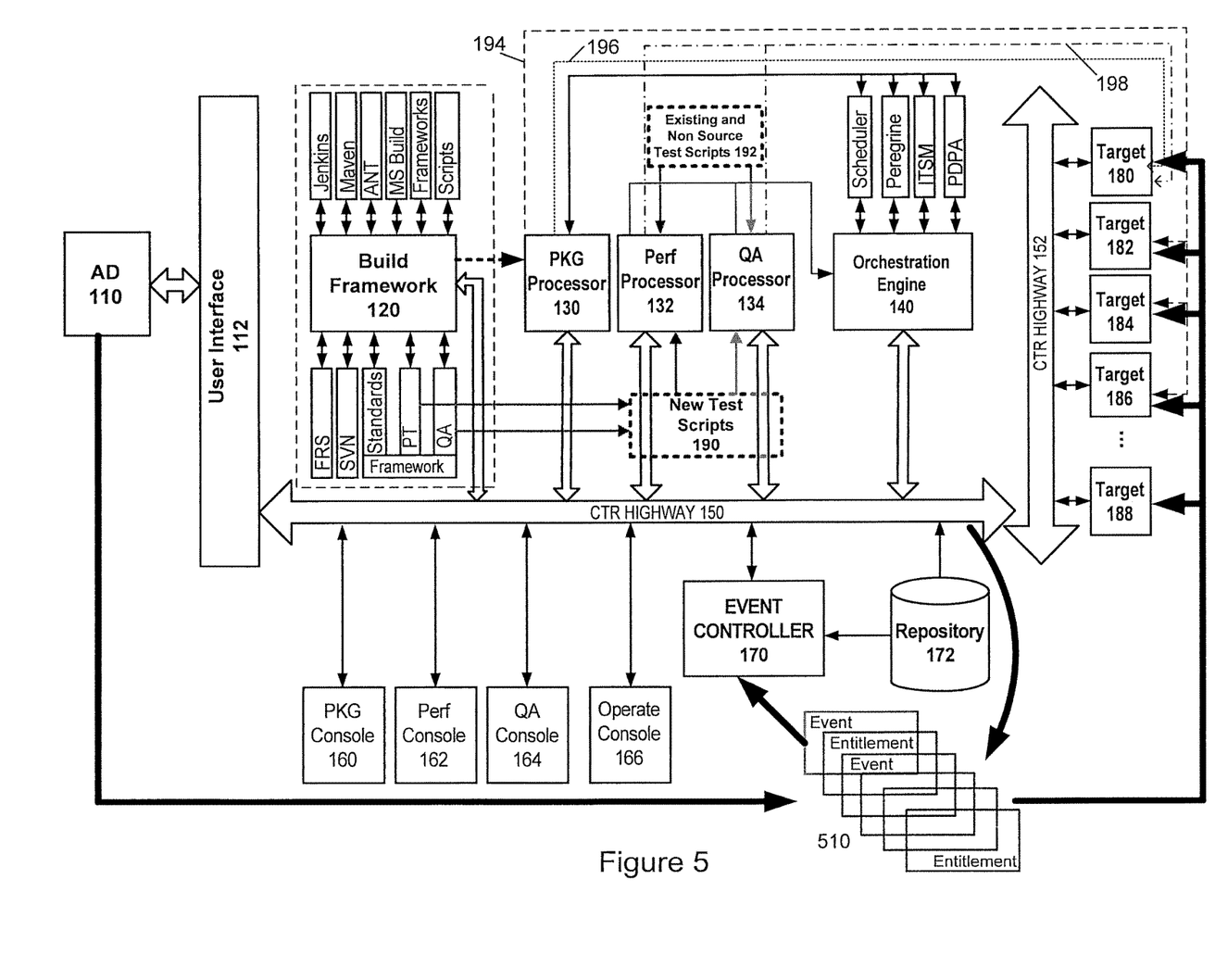
FIG. 5 is an exemplary diagram of entitlements, according to an embodiment of the present invention.

FIG. 5 is an exemplary diagram of entitlements, according to an embodiment of the present invention. In this example, AD 110 may communicate entitlements blocks and event blocks, represented by 510, to various Targets, represented by 180, 182, 184, 186, 188. As shown in FIG. 5, AD may create an Entitlement block. The Entitlement block may be referenced by a Target during execution. As shown in FIG. 5, an Event block may be read by Event Controller 170 and entitlement blocks may be read by Targets. An Event may represent any type of occurrence or change in the system, such as submitting a new build, build failure, build success, etc. An embodiment of the present invention is directed to creating automated test scripts (including performance test scripts) and employing Blockchain to entitlements as well as monitor and manage events as they occur in the system.

Figure 6:
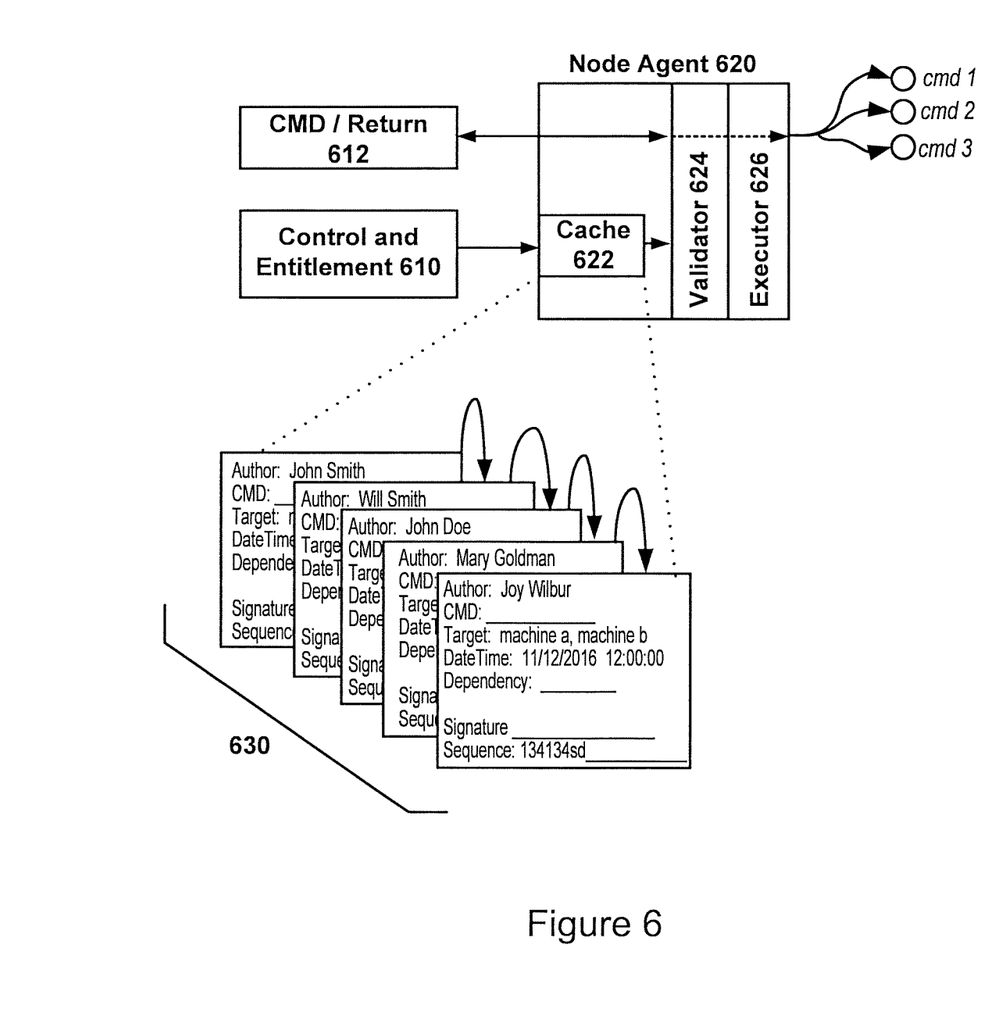
FIG. 6 is an exemplary illustration of a Node Agent, according to an embodiment of the present invention.

FIG. 6 is an exemplary illustration of a Node Agent, according to an embodiment of the present invention. As shown in FIG. 6, Node Agent 620 may receive inputs from Control and Entitlement 610 where data may be stored in Cache 622. Remote commands to be executed may be sent to the Node Agent for processing which then follows the entitlements to complete the request. The results of the execution may be returned to the requester by the Node Agent. Once a command request (e.g., cmd1, cmd2, cmd3, etc.) is received by the Node Agent, it may validate the request based on the entitlements that are in Cache 622. As shown in FIG. 6, entitlements stored in Cache 633 are illustrated by 630. Upon successful validation of the request, the command may then be forwarded to Executor 626 for execution of the command and return the results to the requester, via 612. In some cases, there may be more than one execution as a command may have dependency commands to be fulfilled. The requests and the dependencies may be validated by Validator 624 with the entitlements.

Figure 7:
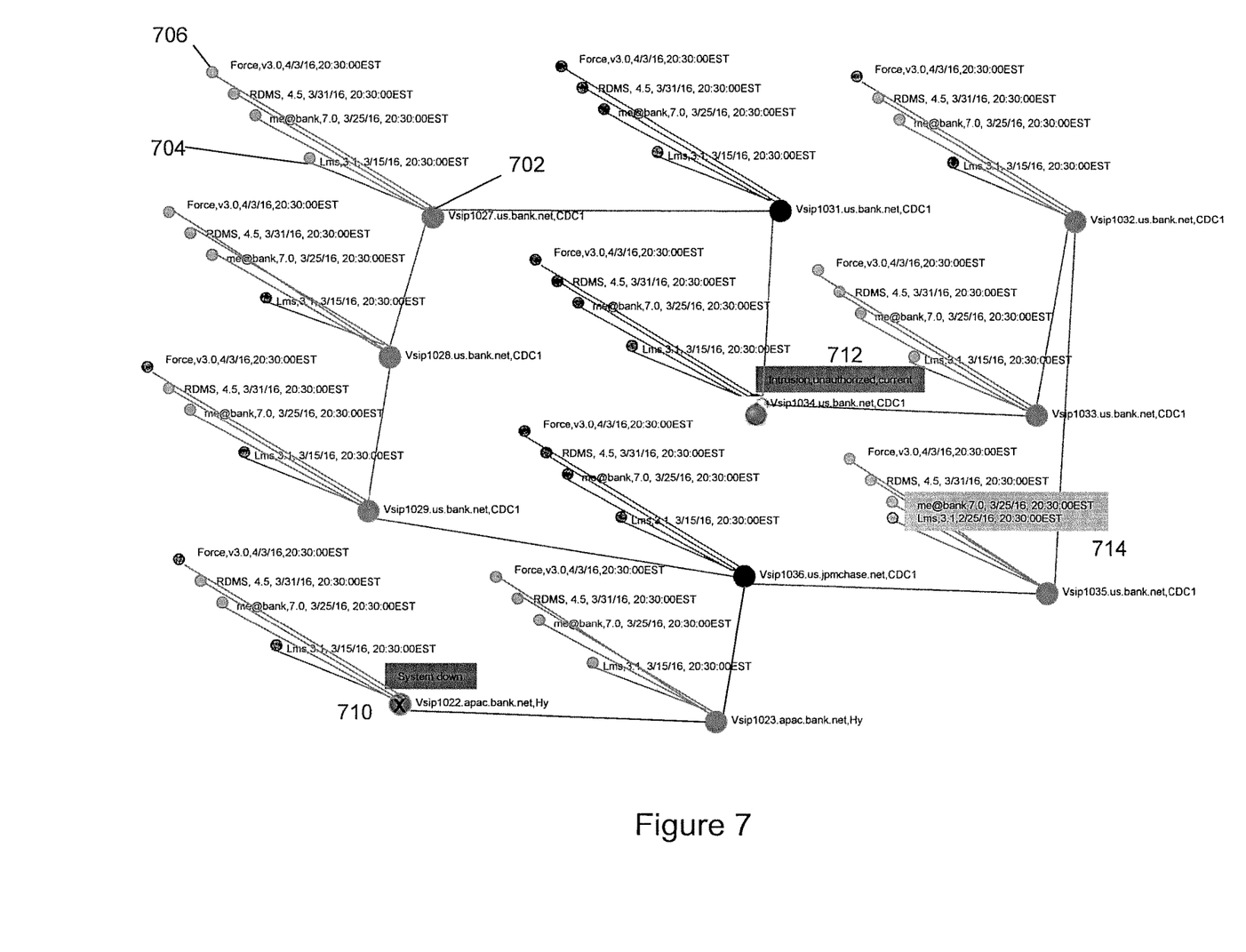
FIG. 7 is an exemplary screenshot of an event dashboard, according to an embodiment of the present invention.

FIG. 7 is an exemplary screenshot of an event dashboard, according to an embodiment of the present invention. The CTR Highway may capture and provide entitlements and further allow for data mining and creation of an interactive user interface, e.g., a dashboard. FIG. 7 is an exemplary dashboard of an air traffic control view. Using node block technology, described in FIG. 6, the framework of an embodiment of the present invention provides an illustration of impact of a change and how the change effects an entire environment. FIG. 7 illustrates different applications set to be deployed at a given date and time on each target machine. For example, Node 702 represents a Target Machine. Applications are scheduled to be deployed at a deployment date and time. The application scheduled for a near deployment (e.g., Application 704) is illustrated as proximate to the Landing Node while the application scheduled for a later deployment (e.g., Application 706) is illustrated as farther away from the Landing Node (e.g., Node 702). In this example, Application 704 is scheduled ahead of Application 706 for deployment on Target Machine 702. Each target machine is represented as a landing node (e.g., Node 702) with deployment application bundles (e.g., Applications 704, 706). FIG. 7 may also illustrate and verify that certain applications that build off of earlier applications are deployed in a correct sequence. For example, if Application 706 is dependent on Application 704, the system may confirm that Application 704 is scheduled for deployment before Application 706. FIG. 7 further illustrates how Target Machines may be connected. FIG. 7 may also illustrate whether Nodes are in the same or different regions based on type of connection (e.g., different color for different regions, etc.). As shown in FIG. 7, node 710 represents a system down; node 712 represents an intrusion and node 714 represents a warning or possible conflict. For example, if more than one application is scheduled to be deployed on a single target, the system may identify a conflict where the effects of the conflict on downstream components may be displayed. Also, if an unauthorized deployment is scheduled, the system may flag and require approval and other actions.

Figure 8:
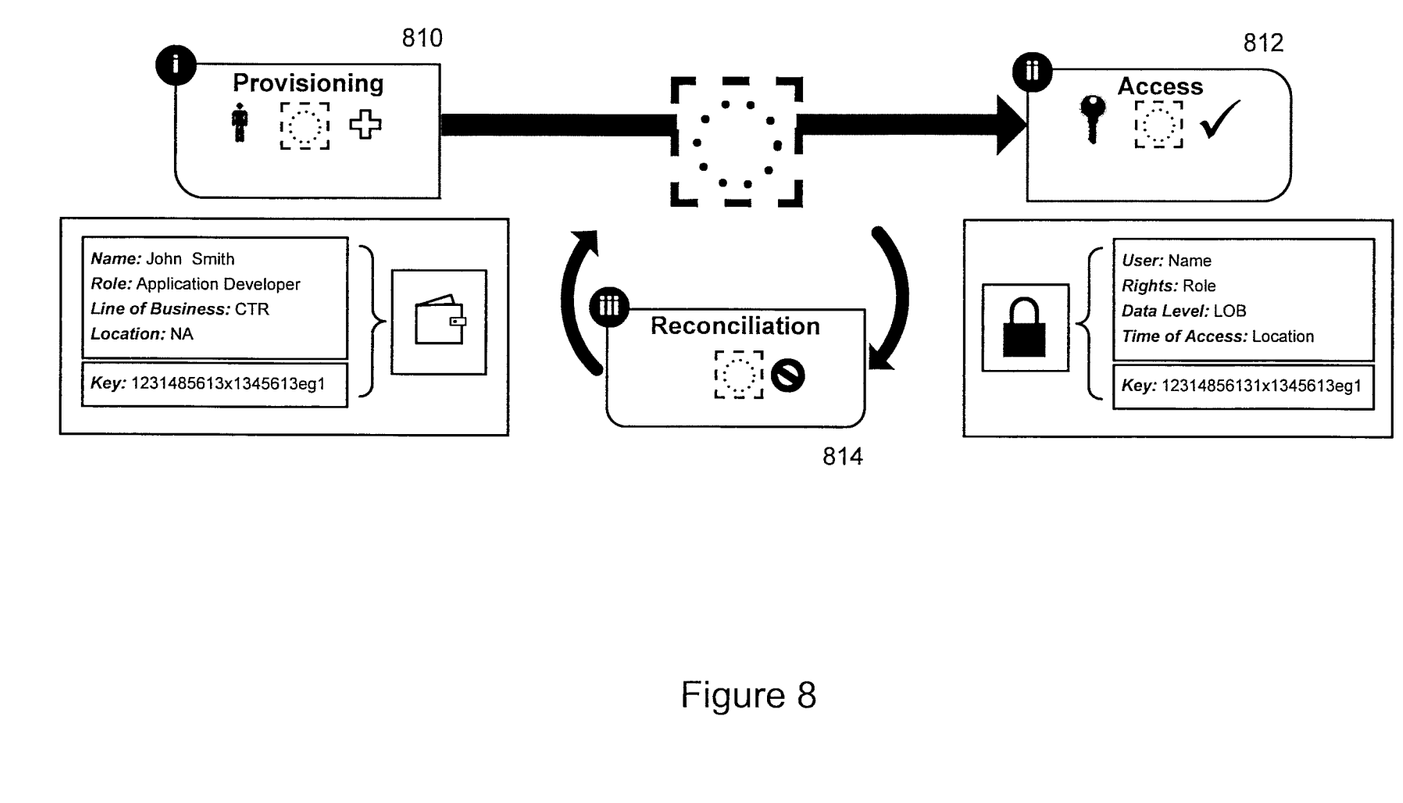
FIG. 8 is an exemplary diagram illustrating entitlements, according to an embodiment of the present invention.

FIG. 8 is an exemplary diagram illustrating entitlements, according to an embodiment of the present invention. An embodiment of the present invention is directed to delivering tools, processes and standards to support user ID provisioning, Ledger based Access, consensus Reconciliation and De-Provisioning. As shown in FIG. 8, provisioning may onboard end users to ledge with unique ID attributes, as shown by 810. The system provides provisioning of users to ledger technology leveraging key entitlement attributes and housing of private encryption key. For example, end users may be onboard to the disturbed ledger based on user attributes in support of trusted access fine grain entitlements along with an encryption key (e.g., private). Access may be provided based on user ID and peer access rules, as shown by 812. Access may be provided based on target environment policies and consensus confirmation of trusted source. For example, target access may be provided based on verification of private key across distributed ledger locations and end user entailment attributes (e.g., name, role, etc.). Reconciliation provides real time systemic review for right updates to ledger, as shown by 814. Reconciliation may be performed as each access transaction is added to the distributed ledger for near real time monitoring and auditability. For example, monitoring may take place based on exceptions and/or anomalies within a distributed leader (e.g., Ledger should be the same across all locations).

The system provides attribute based access by levering codified entitlements that may align to firmwide policies, e.g., separation of duties, privilege access, etc. The system may be non-centralized where entitlements are maintained in distributed ledgers allowing for speed of access and trusted source confirmation. The system may further provide entitlement review with the ability to monitor in near real time transactions aligned to user attributes where access may be confirmed by security and operational teams.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as a communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A system that implements a corporate technologies and risk (CTR) automation framework, the system comprising:
   a hardware memory;
   a self-service portal that receives software code relating to a software application from an application developer, and wherein the self-service portal is based on a distributed ledger functionality for entitlements and events, implemented by a CTR communication network, and wherein the distributed ledger functionality includes microservices for the entitlements and for change and release of the software application;
   a build framework comprising a standards framework, a packaging processor, and an orchestration engine,
      the standards framework configured to automatically generate and implement a set of rules for the software application, the rules relating to one or more of environment, layout, entitlements, and scans and policy of the software application, and the rules based at least one characteristics of the software application relating to the software code received through the serf-service portal and a user environment of the software application;
      the packaging processor configured to generate a packaging wrapper required to create a packaged software application and deliver the packaged software application into a production environment; and
      the orchestration engine configured to execute deployment of the packaged software application, wherein the orchestration engine determines one or more of a deployment location, a deployment environment, and any necessary post testing for the packaged software application; and
   a test framework consisting of a Quality Assurance (QA) processor and a performance processor:
      the Quality Assurance (QA) processor configured to automatically generate and execute one or more QA test scripts for the software application, the QA test scripts verifying completeness and expected results for the software application;
      the performance processor, comprising:
         a parser configured to collect and correlate data for the software application into one or more testable categories;
         a designer configured to provide input to generate performance test scripts based on a set of learned parameters and standards for testing the software application;

an analyzer configured to review and confirm completeness of both the performance test scripts from the designer and the one or more testable categories from the parser; and a validator configured to review an incomplete performance test script of the performance test scripts and any unstructured data that are obtained from the analyzer and then provide the incomplete performance test script, unstructured data and review result to the designer;

the performance processor configured to generate test scripts based on a system integration, application response, the completeness and expected results verified from the execution of the QA test scripts via the QA processor; wherein the application response is based at least in part on consideration of application characteristics resulting from a given load of the software application, and machine learning of one or more alphanumeric inputs for the software application wherein the performance processor generates test flows for possible scenarios based on the one or more alphanumeric inputs, and wherein the machine learning is based on a set of application use cases; and the CTR communication network, coupled to the build framework, QA processor, performance processor, packaging processor, and orchestration engine.

2. The system of claim 1, wherein the set of rules is directed to one or more of: environment overrides, scheduling, and notifications.

3. The system of claim 1, wherein the performance processor performs an automated test generator flow to identify possible inputs for a particular screen generated by the software application.

4. The system of claim 3, wherein the performance processor generates an automated test screen hash comprising a plurality of scenarios for a corresponding input.

5. The system of claim 4, wherein a test case generator automatically generates test cases based on the automated test screen hash.

6. The system of claim 1, where the distributed ledger functionality is Blockchain functionality.

7. The system of claim 1, wherein the events are received by an event controller and entitlements are received by one or more targets.

8. A non-transitory computer readable medium containing program instructions for implementing a corporate technologies and risk (CTR) automation framework, wherein execution of the program instructions by one or more processors of a computer system causes the one or more processors to carry out the steps of:

receiving, via a self-service portal, software code relating to a software application from an application developer wherein the self-service portal is based on a distributed ledger functionality for entitlements and events, implemented by a CTR communication network, and wherein the distributed ledger functionality includes microservices for the entitlements and for change and release of the software application;

providing a build framework comprising a standards framework, a packaging processor, and an orchestration engine;

automatically generating and implementing, by the standards framework, a set of rules for the software application, the rules relating to one or more of environment, layout, entitlements, and scans and policy of the software application, and the rules based at least one characteristics of the software application relating to the software code received through the serf-service portal and a user environment of the software application;

providing a test framework consisting of a Quality Assurance (QA) processor and a performance processor;

automatically generating and executing, via the Quality Assurance (QA) processor, QA test scripts for the software code relating to the software application, the OA test scripts verifying completeness and expected results for the software application;

collecting and correlating, by a parser of the performance processor, data for the software application into one or more testable categories;

providing, by a designer of the performance processor, input to generate performance test scripts based on a set of learned parameters and standards for testing the software application;

reviewing and confirming, by an analyzer of the performance processor, completeness of both the performance test scripts from the designer and the one or more testable categories from the parser;

reviewing, by a validator of the performance processor, an incomplete performance test script of the performance test scripts and any unstructured data that are obtained from the analyzer and then provide the incomplete performance test script, unstructured data and review result to the designer;

generating test scripts based on a system integration, application response, the completeness and expected results verified from the execution of the QA test scripts via the QA processor; wherein the application response is based at least in part on consideration of application characteristics resulting from a given load of the software application, and machine learning of one or more alphanumeric inputs for an application wherein the performance processor generates test flows for possible scenarios based on the one or more alphanumeric inputs, and wherein the machine learning is based on a set of application use cases;

automatically generating, via the packaging processor, a packaging wrapper required to create a packaged software application and deliver the packaged software application into a production environment;

automatically executing, via the orchestration engine, deployment of the packaged software application, wherein the orchestration engine determines one or more of a deployment location, a deployment environment, and any necessary post testing for the packaged software application; and communicating, via the CTR communication network, with one or more targets, the CTR communication network coupled to the build framework, QA processor, the performance processor, packaging processor, and the orchestration engine.

9. The computer readable medium of claim 8, wherein the set of rues is directed to one or more of environment overrides, scheduling, and notifications.

10. The computer readable medium of claim 8, wherein the performance processor performs an automated test generator flow to identify possible inputs for a particular screen generated by the software application.

11. The computer readable medium of claim 10, wherein the performance processor generates an automated test screen hash comprising a plurality of scenarios for a corresponding input.

12. The computer readable medium of claim 11, wherein a test case generator automatically generates test cases based on the automated test screen hash.

13. The computer readable medium of claim 8, where the distributed ledger functionality is Blockchain functionality.

14. The computer readable medium of claim 8, wherein the events are received by an event controller and entitlements are received by the one or more targets.

* * * * *